United States Patent [19]

Sugiura et al.

[11] Patent Number: 4,905,294

[45] Date of Patent: Feb. 27, 1990

[54] IMAGE PROCESSING APPARATUS

[75] Inventors: Susumu Sugiura; Yukio Masuda, both of Atsugi, Japan

[73] Assignee: Canon Kabushiki Kaisha, Tokyo, Japan

[21] Appl. No.: 338,426

[22] Filed: Apr. 14, 1989

Related U.S. Application Data

[63] Continuation of Ser. No. 786,645, Oct. 11, 1985, abandoned.

[30] Foreign Application Priority Data

Oct. 19, 1984 [JP] Japan ................................ 59-218587

[51] Int. Cl.⁴ .............................................. G06K 9/36
[52] U.S. Cl. .......................................... 382/9; 358/456; 382/50; 382/53
[58] Field of Search ................ 358/443, 448, 455–457, 358/464; 382/9, 50, 52, 53

[56] References Cited

U.S. PATENT DOCUMENTS

| | | | |
|---|---|---|---|
| 3,104,372 | 9/1963 | Rabinow et al. | 382/50 |
| 3,234,513 | 2/1966 | Brust | 382/50 |
| 3,644,890 | 2/1972 | Matthews | 382/50 |
| 4,194,221 | 3/1980 | Stoffel | 382/50 |
| 4,414,581 | 11/1983 | Kato et al. | 358/280 |
| 4,547,811 | 10/1985 | Ochi et al. | 358/280 |
| 4,549,220 | 10/1985 | Suzuki | 358/282 |

FOREIGN PATENT DOCUMENTS

| | | |
|---|---|---|
| 0008739 | 3/1980 | European Pat. Off. . |
| 0055834 | 7/1982 | European Pat. Off. . |
| 0100811A | 2/1984 | European Pat. Off. . |
| 57-185446 | 11/1982 | Japan . |
| 2039696A | 8/1980 | United Kingdom . |
| 2103449A | 2/1983 | United Kingdom . |
| 2115256A | 9/1983 | United Kingdom . |
| 2127647A | 4/1984 | United Kingdom . |
| 2153619A | 8/1985 | United Kingdom . |

*Primary Examiner*—Leo H. Boudreau
*Attorney, Agent, or Firm*—Fitzpatrick, Cella, Harper & Scinto

[57] ABSTRACT

An image processing apparatus comprises image data input means and processing means for processing an input image data. The processing means includes image content discrimination means for discriminating whether the input image data represents a half-tone image, a line image or a combination thereof.

5 Claims, 4 Drawing Sheets

FIG. 3A

| 246 | 218 | 202 | 134 | 150 | 186 | 234 | 250 |
|---|---|---|---|---|---|---|---|
| 230 | 166 | 104 | 88 | 72 | 120 | 170 | 206 |
| 182 | 116 | 52 | 36 | 20 | 56 | 108 | 190 |
| 146 | 68 | 16 | 0 | 4 | 40 | 92 | 138 |
| 130 | 84 | 32 | 12 | 8 | 24 | 76 | 154 |
| 198 | 100 | 48 | 28 | 44 | 60 | 124 | 174 |
| 214 | 162 | 112 | 64 | 80 | 96 | 158 | 222 |
| 242 | 226 | 178 | 142 | 126 | 194 | 210 | 238 |

FIG. 3B

| 208 | 144 | 80 | 224 | 208 | 144 | 80 | 224 |
|---|---|---|---|---|---|---|---|
| 64 | 0 | 16 | 160 | 64 | 0 | 16 | 160 |
| 128 | 48 | 32 | 96 | 128 | 48 | 32 | 96 |
| 192 | 112 | 176 | 240 | 192 | 112 | 176 | 240 |
| 208 | 144 | 80 | 224 | 208 | 144 | 80 | 224 |
| 64 | 0 | 16 | 160 | 64 | 0 | 16 | 160 |
| 128 | 48 | 32 | 96 | 128 | 48 | 32 | 96 |
| 192 | 112 | 176 | 240 | 192 | 112 | 176 | 240 |

FIG. 3C

| 0 | 192 | 0 | 192 | 0 | 192 | 0 | 192 |
|---|---|---|---|---|---|---|---|
| 128 | 64 | 128 | 64 | 128 | 64 | 128 | 64 |
| 0 | 192 | 0 | 192 | 0 | 192 | 0 | 192 |
| 128 | 64 | 128 | 64 | 128 | 64 | 128 | 64 |
| 0 | 192 | 0 | 192 | 0 | 192 | 0 | 192 |
| 128 | 64 | 128 | 64 | 128 | 64 | 128 | 64 |
| 0 | 192 | 0 | 192 | 0 | 192 | 0 | 192 |
| 128 | 64 | 128 | 64 | 128 | 64 | 128 | 64 |

FIG. 3D

| 128 | 128 | 128 | 128 | 128 | 128 | 128 | 128 |
|---|---|---|---|---|---|---|---|
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |

IMAGE PROCESSING APPARATUS

This application is a continuation of application Ser. No. 786,645, filed Oct. 11, 1985, now abandoned.

BACKGROUND OF THE INVENTION

1. Field of the Invention

The present invention relates to an image processing apparatus suitable to a facsimile machine, electronic file, reader or digital copying machine.

2. Description of the Prior Art

In a prior art half-tone image processing system, an image signal level of each pixel is compared with a predetermined threshold and if the former is higher, black is reproduced, and if the former is lower, white is reproduced so that a pseudo-gray level is reproduced (systematic dither method). However, since this method has a much lower resolution power than that of a simple binary recording method (fixed threshold binary recording), the quality of reproduction of an image which requires a high resolution power, such as a character area, is lowered.

In order to resolve the above problem, in a method disclosed in Japanese Unexamined Pat. Publication No. 3374/1983 an image is divided into a plurality of blocks and the nature of each block, e.g., half-tone image area such as a photograph area, or a binary image area (line image area) such as a character area, is discriminated by the difference between maximum and minimum density levels of pixels in each block. This method is effective for the character or symbol area but when it is applied to a natural picture, the following problems are encountered:

(A) If a half-tone image area is misjudged to be a binary image area, the area to be represented by gray level is represented by white or black stripes because the half-tone area is processed by a single threshold. Accordingly, the image quality is degraded remarkably.

(B) If the character/symbol area has white or black background and fine black or white characters, that is, if the area has a high contrast, the above method is relatively effective, but if the area has a gray level background and black characters, the gray level area adjacent to the characters is misjudged to be a binary image area and the black or white stripes appear as in (A). Accordingly, the image quality is degraded.

SUMMARY OF THE INVENTION

It is an object of the present invention to eliminate the above-noted disadvantage peculiar to the prior art and to provide an image processing apparatus which reproduces a high quality of image.

It is another object of the present invention to provide an image processing apparatus which reproduces an original image with a high fidelity.

It is another object of the present invention to provide an image processing apparatus having an image discrimination function.

It is another object of the present invention to provide an image processing apparatus having a high processing speed.

It is another object of the present invention to provide an image processing apparatus capable of reproducing a high quality of image with a simple construction.

It is another object of the present invention to provide an image processing apparatus capable of reproducing a high quality of image for any original image.

Other objects, features and advantages of the present invention will be apparent from the following description of the invention.

BRIEF DESCRIPTION OF THE DRAWINGS

FIGS. 3(a)–3(d) show four dither patterns,

DETAILED DESCRIPTION OF THE PREFERRED EMBODIMENTS

Figure 1:
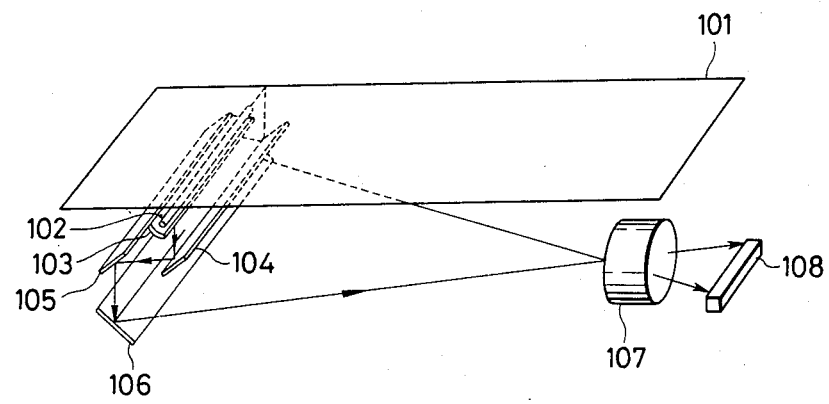
FIG. 1 shows an image reader used in one embodiment of the present invention.

FIG. 1 shows an input device used in an embodiment of the present invention. A document sheet mounted on a transparent document table 101 is illuminated by an illumination system including a lamp 102 and a reflection shade 103, and a reflected light is directed to a first mirror 104, thence to a lens system 107 through a second mirror 105 and a third mirror 106, and focused onto a sensor 108 such as CCD. The sensor 108 is an array sensor which is electronically scanned in a main scan direction and mechanically scanned in a sub-scan direction.

Figure 2A:
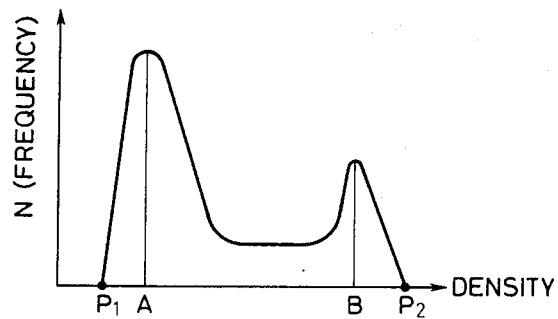
FIGS. 2(a) and 2(b) show density distributions of image signals.
Figure 2B:
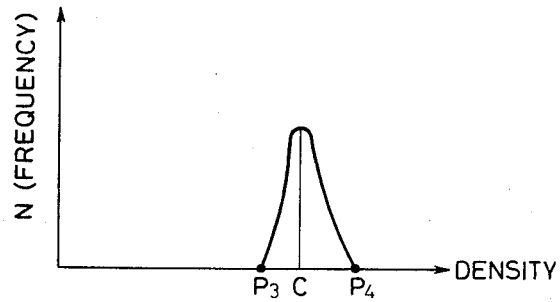

FIGS. 2(a) and 2(b) show distributions of frequencies of appearance of blocks versus image densities when a portion of an original is viewed through an n x n-pixel block window. FIG. 2(a) shows the frequency of appearance around characters. Point A shows a density of background of the original image, and point B shows a density of the character area. FIG. 2(b) shows a histogram around a half-tone image. Point C shows a mean density of the half-tone image.

In the prior art system, if the histogram of the image area to be discriminated has a distribution like that shown in FIG. 2(a), it is discriminated as a character/symbol area or a line image area because the absolute value of $P_2-P_1$ is large, and if it has a distribution as shown in FIG. 2(b), it is discriminated as a half-tone image area because the absolute value of $P_4-P_3$ is small.

However, depending on the size of the pixel block under consideration, the image area does not in general suddenly change from the half-tone image area to the line image area but there must be an area block in which both types of images are contained. In the prior art system, processing for one of two image types is nonetheless selected at this point. As a result, the image quality is degraded.

In the present embodiment, the binary image selection is not effected when the image area changes from the half-tone image area to the line image area, but a dither pattern which is suitable for representing the half-tone is gradually changed to a dither pattern which is suitable to simple binary representation so that white or black stripes which appeared in the prior art systems when the pattern is switched no longer appear. This is attained by selecting the dither pattern in accordance with a difference between maximum and minimum image signals so that image processing appropriate for the image area is carried out.

FIGS. 3(a)–3(d) show examples of dither patterns when an input image signal has 0-255 tone levels. FIGS. 3(a) shows a basic pattern (threshold matrix) having 65 tone levels (8×8+1=65) and a resolution power of ⅛, FIG. 3(b) shows a basic pattern having 17 tone levels and a resolution power of ¼, FIG. 3(c) shows a basic pattern having 5 tone levels and a resolution power of ½, and FIG. 3(d) shows a basic pattern having 2 tone levels and a resolution power of 1. For the same 8×8 pixels, the number of tone levels and the resolution power can be changed by appropriate choice of the internal threshold array.

Figure 4:
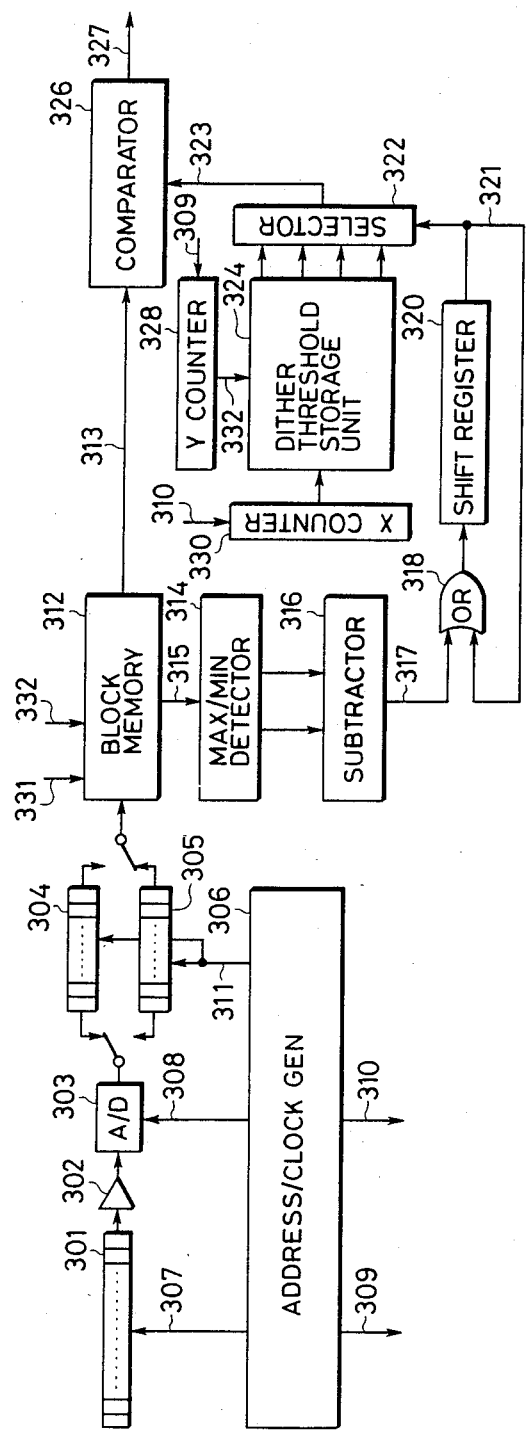
FIG. 4 is a block diagram of a first embodiment of the image processing apparatus.
Figure 5:
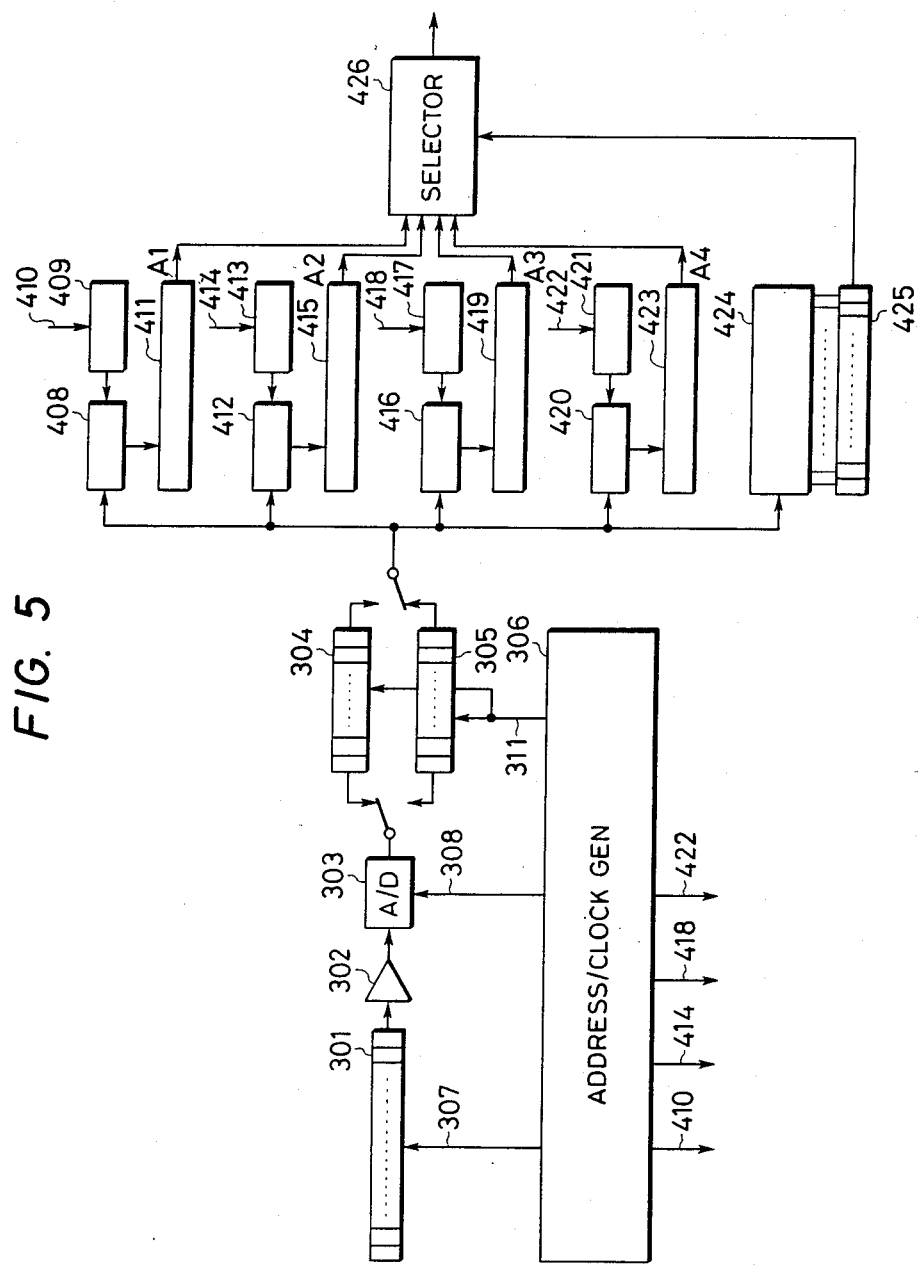
FIG. 5 is a block diagram of a second embodiment of the image processing apparatus.

Referring to FIGS. 4 and 5, embodiments of the present image processing apparatus which uses the input device shown in FIG. 1 and selectively uses the patterns shown in FIGS. 3(a)–3(d) to improve the image quality are explained.

FIG. 4 shows a block diagram of the first embodiment of the image processing apparatus. Numeral 301 denotes an input sensor which corresponds to 108 in FIG. 1. An image signal is amplified by a video amplifier 302 in synchronism with a clock signal 307 sent from a sensor driver (not shown) and an address/clock generator 306, and the output from the video amplifier 302 is supplied to an analog digital converter 303 where the analog pixel data is converted to digital data. The digitized pixel data is supplied to line buffer memories 304 and 305 each having a memory capacity equal to the number of pixels of the input sensor 301. The two line buffer memories are provided in order to allow concurrent input to and output from the line buffer memory.

The image signal stored in the line buffer memory is transferred to a block memory 312 in synchronism with a clock 311. The block memory 312 has a capacity of one line in a main scan direction of the image signal in the length thereof, and a width equal to the width in the sub-scan direction of the block under consideration. If the number of pixels in one line in the main scan direction is equal to M and the block under consideration has n×m pixels, the necessary capacity of the block memory is M×m pixels. For real time processing, 2×M×m pixels are required.

The image signal 313 made up of pixels sequentially selected one at a time from the block memory 312 is compared with a dither threshold 323 by a comparator 326, which produces a binary image signal 327. In the following description, it is assumed that the size of the pixel block under consideration is 4×4 pixels, the number of in one line of the sensor is 400 pixels, the size of the dither matrix is 8×8, and one pixel of image signal (A/D-converted image signal) is represented by 8 bits (=1 byte). Under the above assumption, the number of blocks in one line is equal to 400 (pixels/line)/4 (pixels/block)=100 (blocks/line). When 100 blocks (4 lines) of image signal have been stored in the block memory 312, the subsequent image signal is stored in the remaining 0 blocks of memory area, and a maximum/minimum detector 314 produces a signal for each block based on the 100 blocks of image signal previously stored in the block memory 312. The maximum/minimum detector 14 also detects maximum and minimum densities of the pixels in each block and stores that information in a memory in the maximum/minimum detector 314. This memory has a 200-byte capacity, to store two pixels of the image signal for each block. The maximum/minimum detector 314 may be a comparator, flip-flop or memory.

The minimum/maximum detector 314 stores the maximum and minimum densities for each block and also supplies them to a subtractor 316. The subtractor 316 sends an absolute value 317 of a difference between the maximum and minimum densities for each block, to a shift register 320 through an OR gate 318.

The shift register 320 has a capacity of 100 bytes, one for each block. Thus, the density differences of the 100 blocks previously stored are stored in the shift register 320. From the readout from the block memory 312 to the storing of the density differences into the shift register 320, no synchronization with the clock 307 of the sensor 301 is necessary, and real time processing can be attained.

A dither threshold memory 324 contains four patterns as shown in FIGS. 3(a)–3(d). In order to select one of the four patterns, two bits are required for a select input 321 (output of the shift register 320) of a selector 322. The shift register 320 appropriately compress (quantizes) the density differences stored therein (into two-bit codes in the present embodiment) to produce the select input 321.

An X counter 330 and a Y counter 328 are used to address one threshold in the 8×8 dither matrix. In the present embodiment, both the X counter 330 and the Y counter 328 are of 3-bit configuration. Thus, the dither threshold memory 324 outputs four thresholds selected by the X counter 330 and the Y counter 328. One of the four thresholds is selected by a selector 322 in accordance with the selector input 321 which represents the compressed density difference. The selected threshold must be the most appropriate one to the image area of the block.

A comparator 326 compares the selected threshold 323 with the image signal of the pixel from the block memory 312 selected by the outputs 331 and 332 of the X counter 330 and the Y counter 328 of the block. The clock 310 for the X counter 330 indicates the step in the X direction of the original image, and the clock 309 of the Y counter 328 is generated based on the clock in the Y direction (for example, a clock sent to a drive source to move the sensor in the sub-scan direction).

In this manner, the first line of image signal (the first 100 blocks) is binarized by the optimum threshold for the block. Since the output 320 of the shift register is fed back through the OR gate 318, the same selector output 321 is again used for the second line. Accordingly, in order to binarize 100 blocks (four lines) of pixels, four circulations in the shift register 320 are required.

By the time the first 100 blocks of pixels are binarized, the next 100 blocks (four lines) of pixels have been stored in the block memory 312. Thus, the next 100 blocks are processed in the same manner so that the image signals sent from the sensor 301 are successively binarized.

FIG. 5 shows a second embodiment of the present invention. In the present embodiment, the image signal is compared with a plurality of dither patterns, and comparison results are stored and then one of them is selected in accordance with an image area discrimination result. Numerals 301–311 denote the same elements as those shown in FIG. 4. Like in the previous embodiment, it is assumed that one block has 4×4 pixels and one line has a length of 400 pixels.

The output data from the line buffer memory 304 or 305 is supplied in parallel to digital comparators 408, 412, 416 and 420, and an image area discriminator 424.

Numerals 409, 413, 417 and 421 denote memories which contain four patterns of FIG. 3, respectively.

Signals 410, 414, 418 and 422 applied to the memories 409, 413, 417 and 421 are address signals generated by the address/clock generator 306 and each of which contains three low order bits in the X direction and three low order bits in the Y direction of the position address of the original image. Accordingly, each of the address signals 410, 414, 418 and 422 selects one of 64 (=8×8) thresholds. The signals 410, 414, 418 and 422 designate the same position in the four dither patterns at the same timing.

Each pixel from the line buffer memory 304 or 305 is compared by the respective thresholds by the comparators 408, 412, 416 and 420, and the binarized comparison results are supplied to shift registers 411, 415, 419 and 423, respectively, each having a capacity of 400 bits×4 lines to store 4 lines of binarized image signal.

Numeral 424 denotes the image area discriminator which comprises the block memory 312, maximum/minimum detector 314 and subtractor 316 shown in FIG. 4, numeral 425 denotes a discrimination result memory which comprises the OR gate 318, shift register 320 of FIG. 4 and a compressor for compressing the discrimination result. The above elements function in the same manner as the previous embodiment.

An output 425 is a coded output (2-bit coded output in the present embodiment) of the image area discrimination results for 100 blocks, corresponding to four lines of image signal. The shift registers 411, 415, 419 and 423 each store four lines of image signal binarized in accordance with one of four dither patterns, and produces a binarized signal A1, A2, A3 or A4. The signal binarized by the most appropriate dither pattern to the block is selected by the selector 426 by the signals A1, A2, A3 and A4. Since the shift registers 411, 415, 419 and 423 each have a four-line capacity, they are synchronized with the image area discriminator 424.

Two embodiments of the present invention have been described. A feature common to both embodiments is that a plurality of threshold patterns are selectively used in accordance with the discrimination result for the image area while the prior art image area discrimination uses either a dither pattern or a single-threshold pattern. As a result, instead of switching between half-tone area and line image area, several selection patterns are used between those two types of image area. Thus, the abrupt pattern change is avoided and the degradation of the image quality due to misdiscrimination of the image area is prevented. When the image area is definite, the advantage of the prior art system is also attained. In this manner, the overall image quality is improved.

In the above embodiments, the threshold matrix and comparators are used for binarization process such as dither processing. Alternatively, a memory such as a ROM may be addressed by the image data (or address data) so that it is binarized. In this case, the ROM outputs the binarized "1" and "0" data.

The present invention is not limited to the illustrated embodiments but various modifications can be made within a scope of the claims.

We claim:

1. An image processing apparatus comprising:
   image data input means; and
   processing means for processing image data input by said image data input means, said processing means including image content discrimination means for discriminating a content of the input image data and binarization means for binarizing the input image data;
   wherein said discriminating means divides the input image data into a plurality of blocks and discriminates the image content for each of said blocks, each of said blocks comprising a plurality of image data;
   wherein said binarization means includes:
      first, second and third binarizing circuits for binarizing the input image data using first, second and third threshold matricies different from each other to output respectively first, second and third binary data, and
      first, second and third memory means for storing the first, second and third binary data output from said first, second and third binarization means, respectfully;
   wherein said first, second and third memory means are capable of storing said first, second and third binary data of plural lines associated with said block, respectively, to delay said first, second and third binary data, respectively, in response to a discrimination operation performed by said discrimination means; and
   wherein said processing means includes means for selecting one of said first, second and third binary data output from said first, second and third memory means in accordance with a result of the discrimination operation performed by said discrimination means.

2. An image processing apparatus according to claim 1 wherein said discrimination means discriminates the image content of each block on the basis of maximum and minimum image data in each block.

3. An image processing apparatus according to claim 1, wherein said discrimination means discriminates whether the input image data represents a half-tone image, a line image or a combination thereof on the basis of difference in image density of the image data of said block.

4. An image processing apparatus according to claim 1, wherein said binarization means comprises a fourth binarizing circuit for binarizing the input image data using a fourth threshold matrix different from each of said first, second and third threshold matrices to output fourth binary data, and fourth memory means for storing the fourth binary data output from said fourth binarizing circuit, and wherein said selecting means selects one of said first, second, third and fourth binary data outputted from said first, second, third and fourth memory means, respectively.

5. An apparatus according to claim 1, wherein said first, second and third threshold matrices have different respective resolutions.

* * * * *

UNITED STATES PATENT AND TRADEMARK OFFICE
CERTIFICATE OF CORRECTION

PATENT NO. : 4,905,294

DATED : February 27, 1990

INVENTOR(S) : SUSUMU SUGIURA, ET AL.

It is certified that error appears in the above-identified patent and that said Letters Patent is hereby corrected as shown below:

DRAWINGS

SHEET 3 OF 4

FIG. 4, "SUBTRACTOR" should read --SUBTRACTER--.

COLUMN 1

Line 47, "the" should be deleted.

COLUMN 2

Line 52, "area block" should read --area (block)--.

COLUMN 3

Line 2, "FIGS." should read --FIG.--.
    Line 50, "of in" should read --of pixels in-- and "400 pixels," should read --400,--.
    Line 57, "remaining 0" should read --remaining 100--.
    Line 62, "14" should read --314--.

COLUMN 4

Line 3, "subtractor" (both occurrences) should read --subtracter--.
    Line 19, "compress" should read --compresses--.

COLUMN 5

Line 21, "subtractor" should read --subtracter--.

UNITED STATES PATENT AND TRADEMARK OFFICE
CERTIFICATE OF CORRECTION

PATENT NO. : 4,905,294
DATED : February 27, 1990
INVENTOR(S) : SUSUMU SUGIURA, ET AL.

Page 2 of 2

It is certified that error appears in the above-identified patent and that said Letters Patent is hereby corrected as shown below:

COLUMN 6

Line 18, "matricies" should read --matrices--.
    Line 24, "respectfully;" should read --respectively;--.
    Line 39, "1" should read --1,--.

Signed and Sealed this

Twenty-second Day of October, 1991

Attest:

HARRY F. MANBECK, JR.

*Attesting Officer*      *Commissioner of Patents and Trademarks*